United States Patent
Cook

(10) Patent No.: US 9,721,187 B2
(45) Date of Patent: Aug. 1, 2017

(54) SYSTEM, METHOD, AND COMPUTER PROGRAM PRODUCT FOR A STEREOSCOPIC IMAGE LASSO

(71) Applicant: NVIDIA Corporation, Santa Clara, CA (US)

(72) Inventor: David R. Cook, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 605 days.

(21) Appl. No.: 14/015,941

(22) Filed: Aug. 30, 2013

(65) Prior Publication Data

US 2015/0063679 A1 Mar. 5, 2015

(51) Int. Cl.
| | |
|---|---|
| *G06K 9/00* | (2006.01) |
| *G06K 9/62* | (2006.01) |
| *G06F 3/0481* | (2013.01) |
| *G06F 3/0484* | (2013.01) |
| *G06T 7/70* | (2017.01) |

(52) U.S. Cl.
CPC ....... *G06K 9/6212* (2013.01); *G06F 3/04815* (2013.01); *G06F 3/04842* (2013.01); *G06T 7/70* (2017.01); *G06T 2200/24* (2013.01); *G06T 2207/10012* (2013.01); *G06T 2207/20104* (2013.01)

(58) Field of Classification Search
CPC ............ G06F 3/04815; G06F 3/04842; G06K 9/6212; G06T 2200/24; G06T 2207/10012; G06T 2207/20104; G06T 7/004
See application file for complete search history.

(56) References Cited

U.S. PATENT DOCUMENTS

| | | |
|---|---|---|
| 2006/0001656 A1 | 1/2006 | LaViola et al. |
| 2008/0056564 A1* | 3/2008 | Lindbloom .......... G06K 9/4652 382/162 |
| 2013/0148882 A1 | 6/2013 | Lee |
| 2014/0003684 A1 | 1/2014 | Ayed et al. |
| 2014/0267426 A1 | 9/2014 | Cook |

OTHER PUBLICATIONS

Morse, Bryan, et al. "Patchmatch-based content completion of stereo image pairs." 3D Imaging, Modeling, Processing, Visualization and Transmission (3DIMPVT), 2012 Second International Conference on. IEEE, 2012.*
Price, Brian L., and Scott Cohen. "Stereocut: Consistent interactive object selection in stereo image pairs." Computer Vision (ICCV), 2011 IEEE International Conference on. IEEE, 2011.*

(Continued)

*Primary Examiner* — Nirav G Patel
(74) *Attorney, Agent, or Firm* — Zilka-Kotab, PC

(57) ABSTRACT

A system, method, and computer program product for providing a lasso selection tool for a stereoscopic image is disclosed. The method includes the steps of obtaining a lasso region of a stereoscopic image pair based on a path defined by a user using a lasso selection tool. An object in a first image of the stereoscopic image pair is identified, where the object is at least partially included within the lasso region and the object is identified in a second image of the stereoscopic image pair.

4 Claims, 13 Drawing Sheets

(56) References Cited

OTHER PUBLICATIONS

Ju, Ran, Tongwei Ren, and Gangshan Wu. "StereoSnakes: contour based consistent object extraction for stereo images." Proceedings of the IEEE International Conference on Computer Vision. 2015.*
David R. Cook, U.S. Appl. No. 13/802,436, filed Mar. 13, 2013.
Non-Final Office Action from U.S. Appl. No. 13/802,436, dated Jan. 30, 2015.
Final Office Action from U.S. Appl. No. 13/802,436, dated Jul. 8, 2015.
Advisory Action from U.S. Appl. No. 13/802,436, dated Sep. 24, 2015.
Non-Final Office Action from U.S. Appl. No. 13/802,436, dated Nov. 5, 2015.

* cited by examiner

SYSTEM, METHOD, AND COMPUTER PROGRAM PRODUCT FOR A STEREOSCOPIC IMAGE LASSO

FIELD OF THE INVENTION

The present invention relates to digital image editing, and more particularly to a lasso selection tool implemented for a stereoscopic image.

BACKGROUND

One particularly important function implemented by many conventional two-dimensional (2D) image editing programs is the identification and/or selection of a portion of a scene for image manipulation. As is well-known, programs like Microsoft™ Paint and Adobe™ Photoshop include various tools for selecting portions of an image. Rectangular and elliptical marquees enable a user to select a portion of the image having a rectangular or elliptical shape, respectively. Another common selection tool implemented by Photoshop and other image editing programs is the magic wand tool, which allows a user to select a particular pixel and select other pixels in a contiguous region that are similar in color to the selected pixel. Yet another common tool implemented by many image editing programs is the lasso tool. The lasso selection tool enables a user to draw a freehand (or polygonal) shape around a portion of the image. The lasso selection tool, therefore, enables a user to select portions of the image having an irregular shape.

More recently, stereoscopic images are used to provide a three-dimensional representation of a scene. Each stereoscopic image includes an image pair, where the scene is captured from the left-eye viewpoint to produce a left-eye image and the scene is captured from the right-eye viewpoint to produce a right-eye image. An object that appears to a viewer at a particular depth is located at a (x,y) position in the left-eye image that is different compared with an (x,y) position in the right-eye image.

Conventional techniques for selecting and manipulating objects in a conventional two-dimensional image do not necessarily function properly for editing and manipulating stereoscopic images because there are two images and the objects being selected and manipulated are at different positions within each of the images. Thus, there is a need for selecting of objects within stereoscopic images that addresses this issue and/or other issues associated with the prior art. Thus, there is a need for addressing this issue and/or other issues associated with the prior art.

SUMMARY

A system, method, and computer program product for providing a lasso selection tool for a stereoscopic image is disclosed. The method includes the steps of obtaining a lasso region of a stereoscopic image pair based on a path defined by a user using a lasso selection tool. An object in a first image of the stereoscopic image pair is identified, where the object is at least partially included within the lasso region and the object is identified in a second image of the stereoscopic image pair. In one embodiment, the lasso selection tool may be implemented within a stereoscopic image editor.

DETAILED DESCRIPTION

As described above, conventional 2D image editing programs include a variety of tools that may be used to select different portions of an image. One tool that is used commonly is the lasso selection tool. However, a lasso tool has not been implemented for selecting an object in a stereoscopic image.

Figure 1:
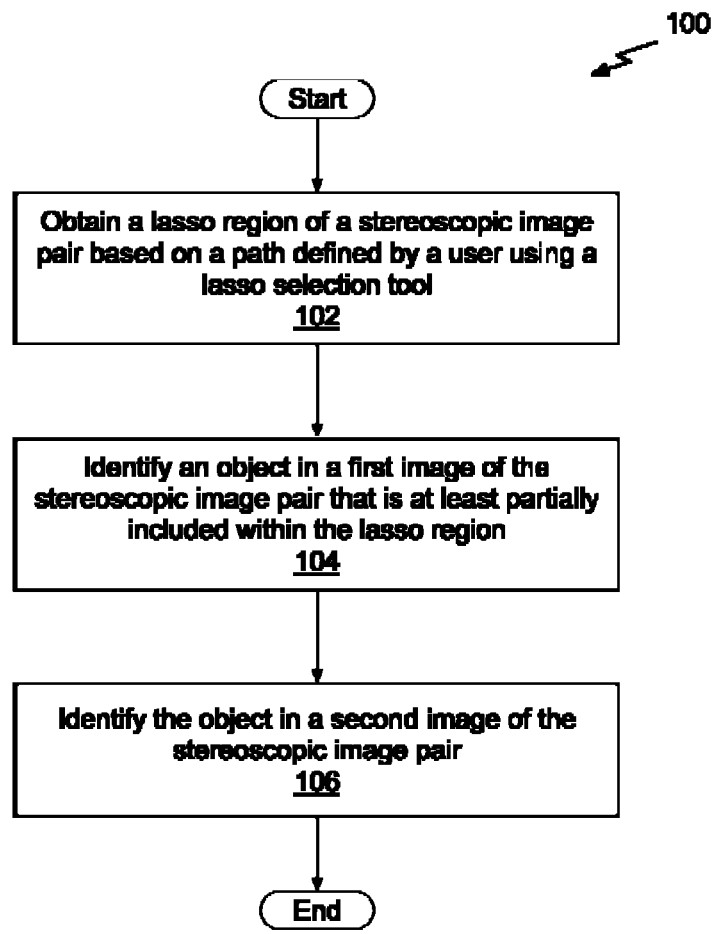
FIG. 1 illustrates a flowchart of a method for providing a lasso for a stereoscopic image editor, in accordance with one embodiment.

FIG. 1 illustrates a flowchart 100 of a method for providing a lasso selection tool for a digital stereoscopic image, in accordance with one embodiment. At step 102, a lasso region of a stereoscopic image pair based on a path defined by a user using a lasso selection tool is obtained. In one embodiment, the path comprises a plurality of points defined using a mouse device. A cursor associated with the mouse device is overlaid on a stereoscopic image displayed on a display device. The user moves the mouse device, using one or more mouse buttons to define the points in the path. In other embodiments, the lasso selection tool may be implemented using other types of input devices, such as a stylus or a capacitive touchscreen display device. At step 104, an object in a first image of the stereoscopic image pair is identified, where the object is at least partially included within the lasso region. At step 106, the object is identified in a second image of the stereoscopic image pair.

In the context of the following description, object selection criterion may be used to identify the object in the first image and the second image of the stereoscopic image pair. The object selection criterion may include one or more pixel characteristic, such as color, depth, pattern, and the like. The object selection criterion may by applied based on a parameter associated with the lasso selection tool, such as a threshold value or a range defined by at least a minimum and/or maximum value of a pixel characteristic. For example, identifying the object in the first image may comprise determining a particular pixel matches a pixel in the lasso region if a difference between a characteristic of the pixel and a target characteristic having the highest frequency in the lasso region is below a threshold value.

It should be noted that, while various optional features are set forth herein in connection with automatically extending lasso regions, such features are for illustrative purposes only and should not be construed as limiting in any manner. In one embodiment, the method described above is implemented, at least in part, by a parallel processing unit.

Figure 2A:
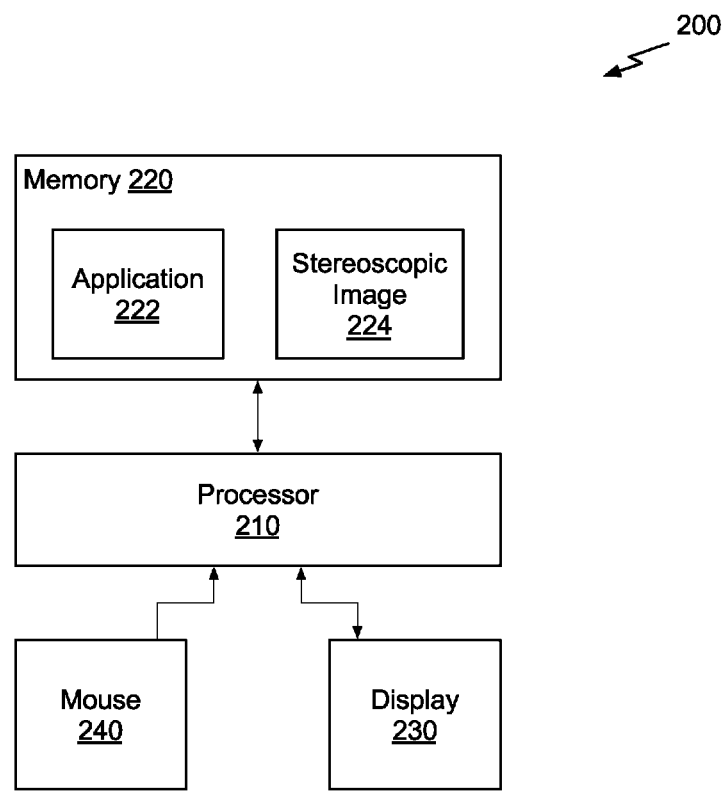
FIG. 2A illustrates a system that is configured to implement at least a portion of the method of FIG. 1, in accordance with one embodiment.

FIG. 2A illustrates a system 200 that is configured to implement at least a portion of the method 100 of FIG. 1, in accordance with one embodiment. As shown in FIG. 2A, the system 200 includes a processor 210 and a memory 220 that stores an application 222 and a stereoscopic image 224. The application 222 is a two-dimensional image editing program. The processor 210 is configured to execute the application 222, which enables a user to manipulate the digital stereoscopic image 224. In one embodiment, the application 222 includes a lasso selection tool that may be used to create a path enclosing a lasso region that that at least partially encloses an object. The object may be identified in a first and second image of the stereoscopic image 224 by the application 222 based on at least one object selection criterion. In the context of the following description, the first image and the second image are a left-eye image and a right-eye image, respectively of a stereoscopic image pair represented by the stereoscopic image 224.

In one embodiment, the application 222 includes a lasso selection tool that includes capabilities to automatically extend the selected lasso region to one or more other regions in the first and second images of the stereoscopic image 224 that are similar to the lasso region according to the object selection criterion, so that portions of the object outside of the path may be selected.

The processor 210 is also coupled to a display device 230 and a mouse device 240. The application 222 may implement a graphical user interface (GUI) that is displayed on the display device 230 and enables a user to manipulate the stereoscopic image 224 using the mouse device 240. The application 222 includes a lasso selection tool that is configured to respond to input from the mouse device 240. The user may use the mouse device 240 to select the lasso selection tool. Then, positioning a cursor associated with the mouse device 240 over the representation of the stereoscopic image 224 on the display device 230, the user selects a plurality of points in the stereoscopic image 224 to generate a path. The application 222 selects the portion of the stereoscopic image 224 enclosed by the path created by the user as the lasso region. Then application 222 may then identify an object that is at least partially included within the lasso region, as further described in conjunction with FIGS. 3C, 3D, 3E, 6A, and 6B.

In one embodiment, the user may draw the path while viewing the stereoscopic image 224 on the display device 230. In another embodiment, the user may draw the path while viewing at least one of the two images (e.g., the first image and the second image) of the stereoscopic image 224, so that the user generates the path on one of the two images and the application 222 generates the path on the other image of the two images.

Figure 2B:
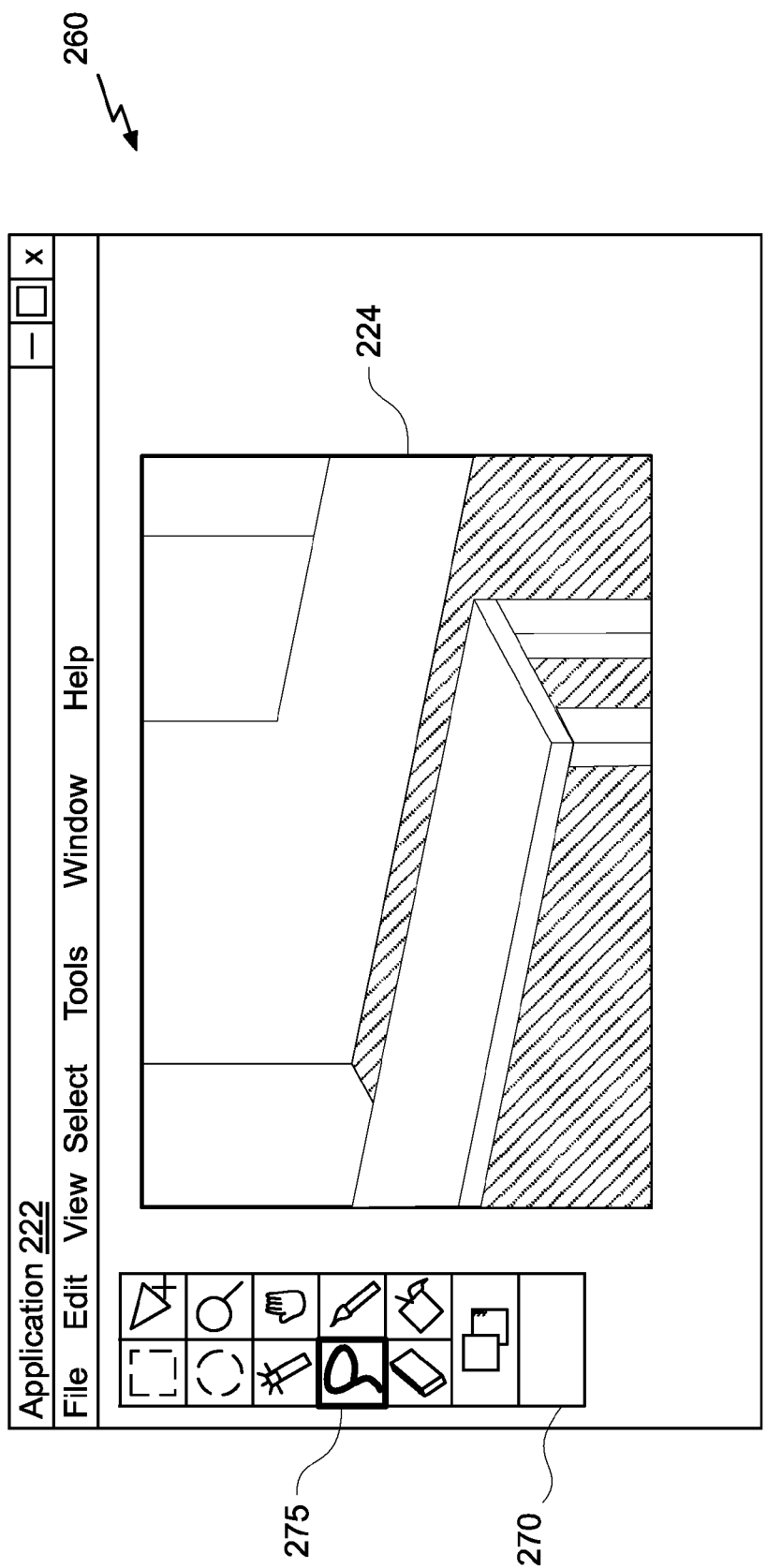
FIG. 2B illustrates a graphical user interface implemented by the application, in accordance with one embodiment.

FIG. 2B illustrates a GUI 260 implemented by the application 222, in accordance with one embodiment. As shown in FIG. 2B, the GUI 260 is a graphical interface that enables a user to manipulate digital images such as stereoscopic image 224. The GUI 260 includes a menu bar as well as a toolbar 270. The user may select tools implemented by the application 222 from one or more of the menu bar or the toolbar 270. In one embodiment, the toolbar 270 includes a lasso selection tool 275. When the user selects the lasso selection tool 275, the user can draw a loose fitting path around a portion of the stereoscopic image 224.

In one embodiment, the application 222 generates the lasso region based on the path created using the mouse device 240. The lasso region may fit tightly to an object when compared to the region enclosed within the path. In other words, the application 222 may detect edges of the object within the region enclosed by the path and fit the lasso region to the closest edge within the region rather than the edge defined by the path.

The lasso selection tool 275 may be similar to a conventional lasso selection tool except that the lasso selection tool 275 may enable a user to automatically extend the lasso region to other similar regions in the image. In other words, the lasso selection tool 275 may enable a user to indicate that the user wishes to select other similar objects or other portions of the same object that match the lasso region. In one embodiment, the lasso selection tool 275 automatically extends the selection to other regions of the image that substantially match the depth, color, and/or texture (i.e., pattern, material, etc.) of the lasso region selected by a user. In another embodiment, the lasso selection tool 275 automatically extends the selection of other regions of the image that substantially match the shape of an object that is at least partially within the lasso region. In other words, edges of objects may be detected by finding edges defined by abrupt changes in color and/or depth across adjacent pixels and the shapes of the edges may be compared to the shape of the lasso region. The shapes may be rotated and scaled to determine whether the shapes substantially match. In yet another embodiment, the luminance channel of the image is used to compare the lasso region to other portions of the image, comparing details of the image based on brightness and not chrominance (i.e., color).

In one embodiment, a user may manually add additional regions to the automatically extended selection to add unrelated portions of the image to the same selection. For example, the user may want to select the walls of a room where one wall is painted grey and another wall is painted blue. The user can first select a portion of the grey wall using the lasso selection tool 275, which is automatically extended to other portions of the grey wall. Then the user can select a portion of the blue wall using the lasso selection tool 275, which is automatically extended to other portions of the blue wall, to include both walls in the resulting selected lasso region.

In one embodiment, the lasso selection tool 275 is associated with one or more parameters that adjust the effectiveness of the matching algorithm implemented by the lasso selection tool 275. For example, the lasso selection tool 275 may be associated with a menu that allows a user to change threshold values corresponding to the matching algorithm. For example, the threshold value may affect how close pixel colors need to be to match pixel colors in the lasso region (e.g., a pixel in the lasso region may have a red channel value of 197 and the threshold may determine whether a pixel having red channel value of 194 matches the pixel in the lasso region). The threshold value may affect how close pixel depths need to be to match pixel depths in the lasso region. In one embodiment, a minimum depth value and/or a maximum depth value may be defined and only pixels having a depth that is inside a range bounded by the minimum and maximum depth values can be identified as being included in the object. The pixel depth may be obtained from a z-buffer corresponding to each of the first image and the second image. In one embodiment, known techniques may be used to derive depth coordinate values for the first image and second images based on an analysis of the first and second images.

In another example, the threshold value may affect how many pixels in a block of pixels need to substantially match pixels in the lasso region in order for the block of pixels to substantially match the lasso region. The threshold values may be entered manually by a user or exposed to the user through slider elements in the GUI 260 that allow the user to dynamically adjust the effectiveness of the matching algorithm.

Figure 3A:
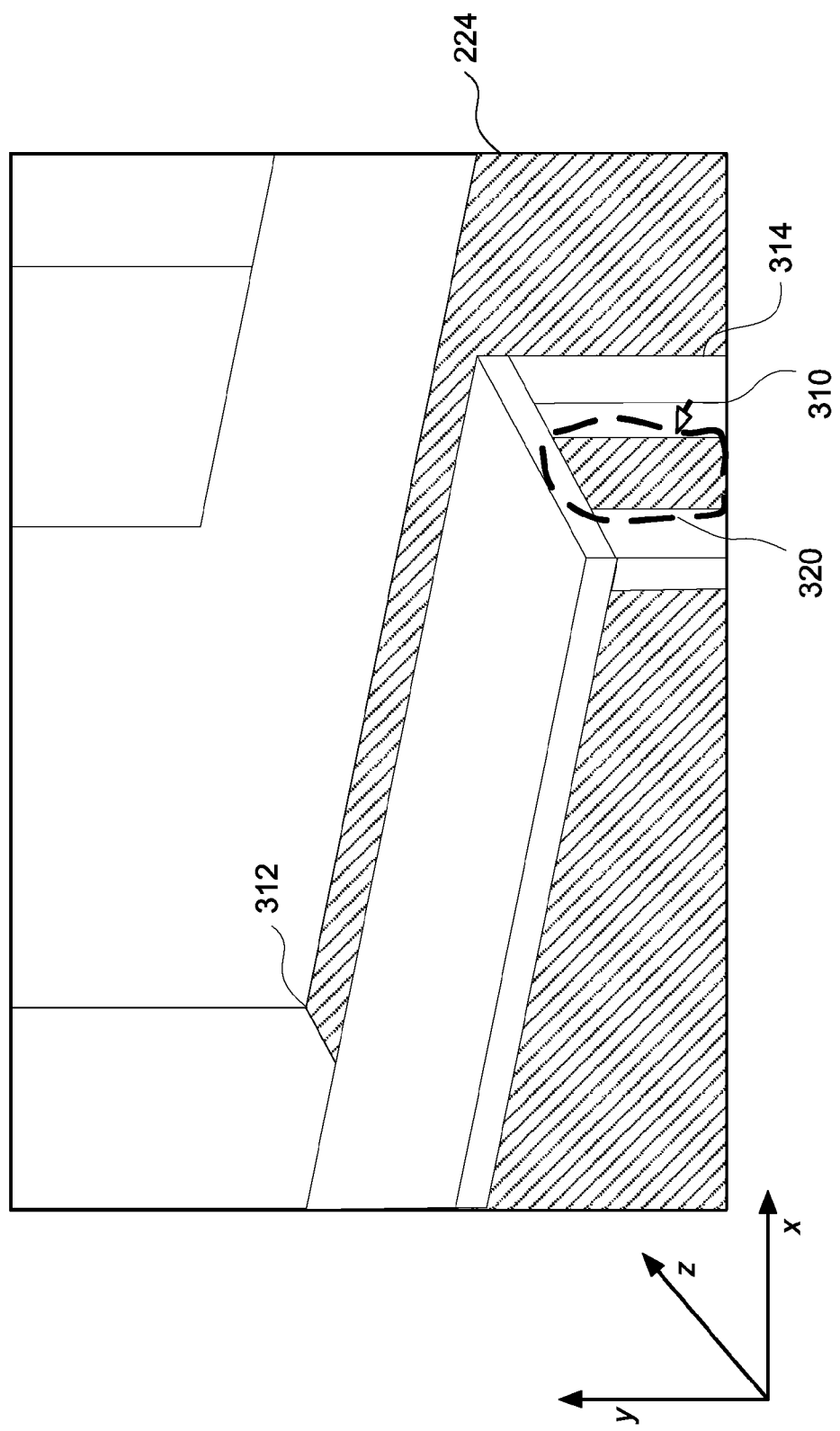
FIG. 3A illustrates a path within a stereoscopic image pair, in accordance with one embodiment.

FIG. 3A illustrates a path 320 in the stereoscopic image 224 of FIG. 2A, in accordance with one embodiment. As shown in FIG. 3A, a user may use the mouse device 240 to move a mouse cursor 310 to define a path 320 in the stereoscopic image 224. In one embodiment, the path 320 comprises a plurality of points selected by a user using a button on the mouse device 240. The points may be connected by straight line segments (i.e., to form a polygonal path) or by curved line segments (i.e., forming a spline or a smooth polynomial function that fits the points such as a Bezier spline). In another embodiment, the path 320 comprises a plurality of points selected based on the position of the cursor 310 at regularly spaced intervals in time from a first activation of the button of the mouse device 240 to a second activation of the button of the mouse device 240. In yet another embodiment, the path 320 is defined based on input from another input device such as a capacitive touchscreen input or a stylus input. It will be appreciated that other forms of input may be used to select the path 320 and that the other forms of input are within the scope of the present disclosure.

Different objects in the stereoscopic image 224 typically correspond with different depth values. For example, the pixels included in the right leg 314 of the table have depth values that are closer to an (x,y) plane positioned at z=0 compared with depth values of pixels in a region near the corner 312. In one embodiment, the points on the path 320 may each correspond to a depth value (z coordinate) provided by the user or a depth value associated with an identified object.

Figure 3B:
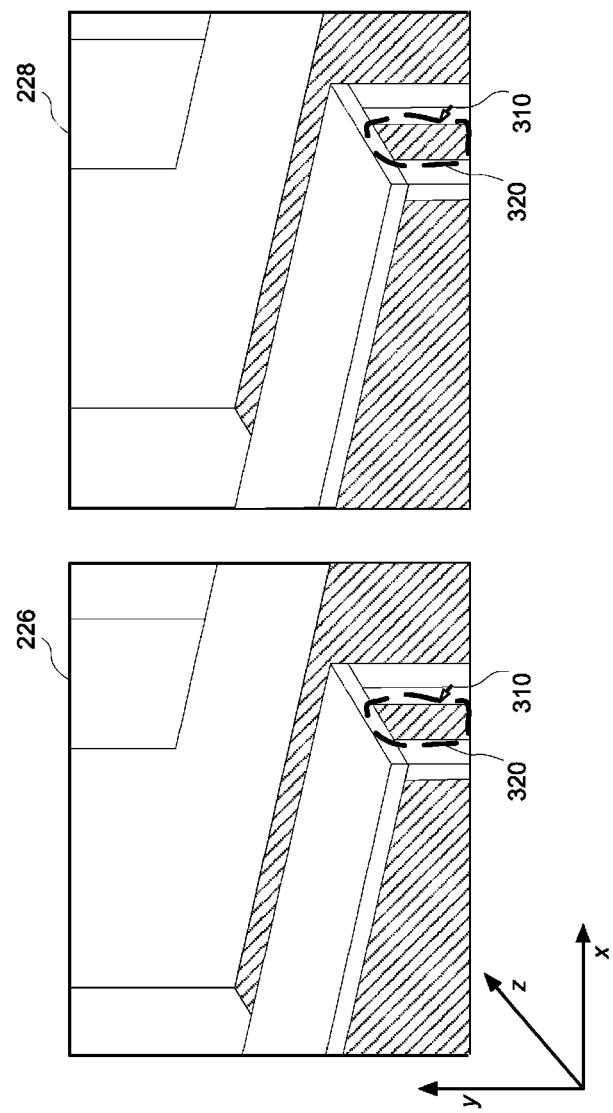
FIG. 3B illustrates the stereoscopic image pair and the path of FIG. 3A, in accordance with one embodiment.

FIG. 3B illustrates the first and second images 226 and 228 of the stereoscopic image 224 and the path 320 of FIG. 3A, in accordance with one embodiment. The objects, such as the table appear at different (x,y) coordinates in the first image 226 compared with the second image 228. In other words, the position of an object in the first and second images 226 and 228 is offset along the x axis. The offset causes the table to appear to an observer as being positioned at a depth (z coordinate) that is behind the display surface positioned at z=0. The offset may vary for different pixels of an object so that the depth of the object varies as well. For example, the offset may vary for the top of the table so that the top appears to be further away as x decreases. Identifying an object within a lasso region in the first image 226 and the second image 228 may use a technique that compares a pixel characteristic within the lasso region and/or across the first image 226 and the second image 228.

Figure 3C:
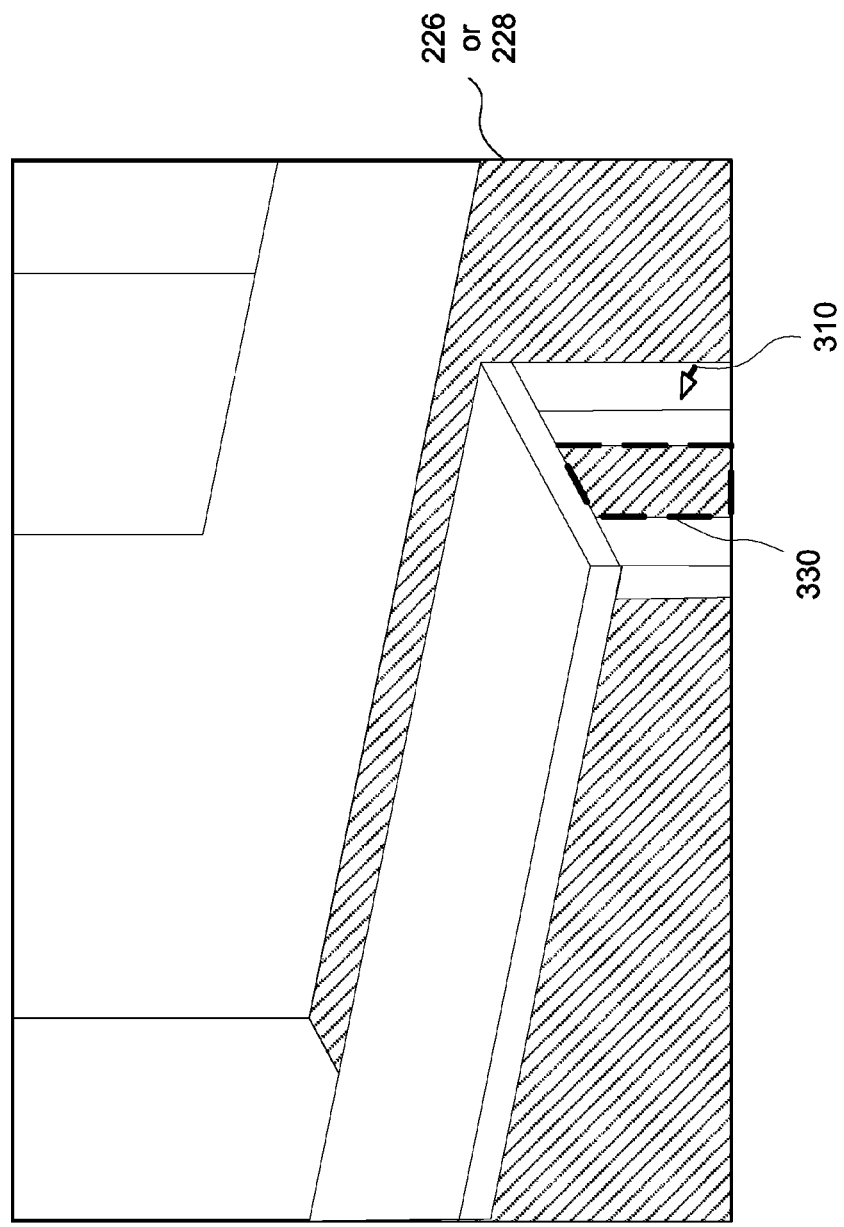
FIGS. 3C through 3E illustrate a technique for automatically extending a lasso region, in accordance with one embodiment.
Figure 3D:
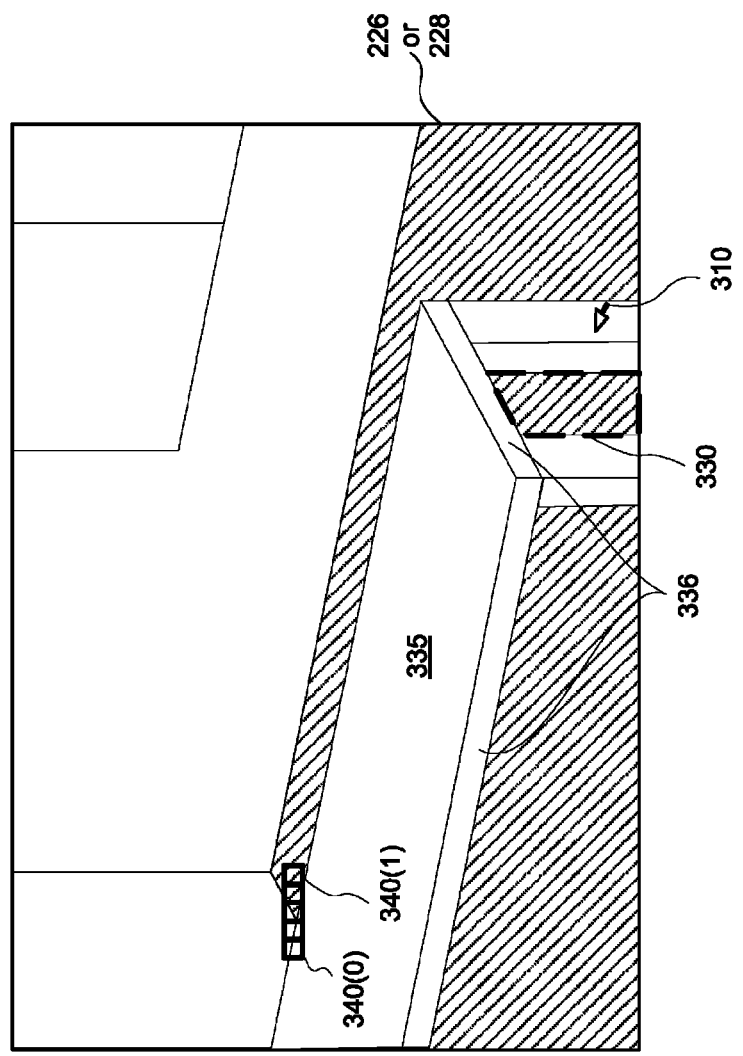
Figure 3E:
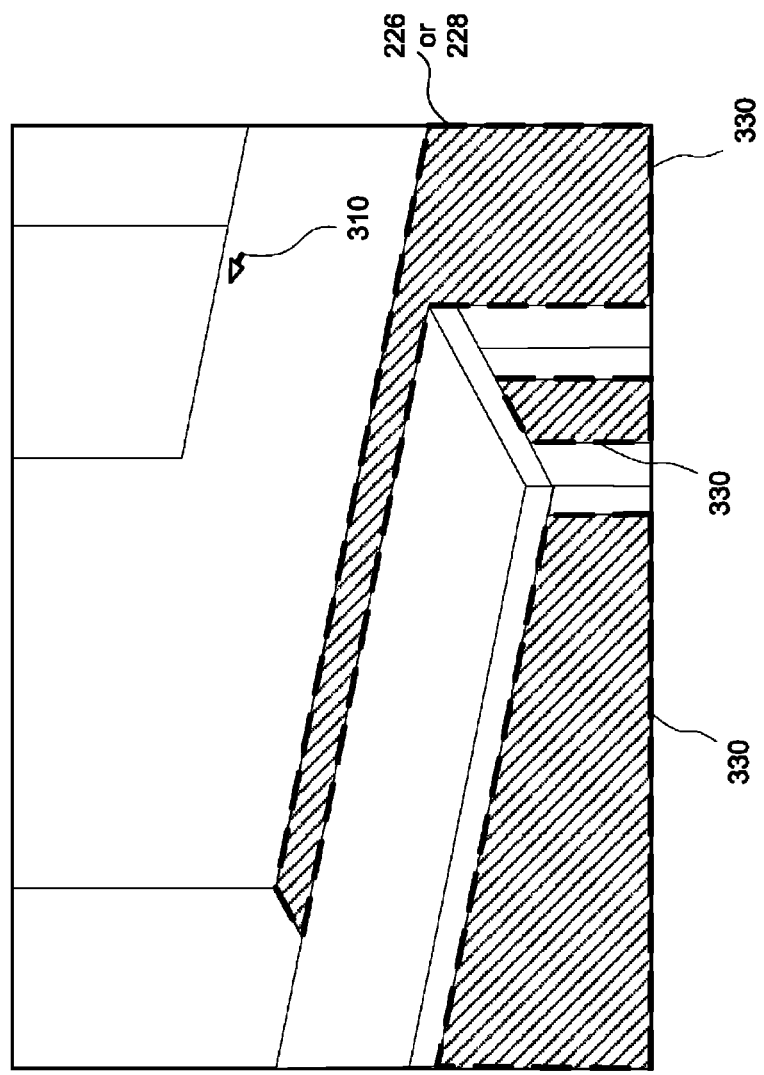

FIGS. 3C through 3E illustrate a technique for automatically extending a lasso region in the stereoscopic image 224, in accordance with one embodiment. As shown in FIG. 3C, once the path 320 has been defined, the application 222 analyzes the portion of the first image 226 and the second image 228 enclosed within the path 320 to determine a selected lasso region 330. In one embodiment, the selected lasso region 330 is defined as a loose selection of all objects within the path 320. In another embodiment, as shown in FIG. 3C, the selected lasso region 330 is defined as a tight selection of one or more objects within the path 320. The path 320 may be modified to define the selected lasso region 330 and enclose an identified object. The modified path may define a selected lasso region 330 including a reduced or increased number of pixels compared with the lasso region within the path 320.

The application 222 may analyze the portion of the first image 226 and the second image 228 enclosed within the path 320 to detect edges of objects enclosed within the path 320. The application 222 may then select the lasso region 330 by moving the points on the path 320 to the nearest edge within the portion of the first image 226 and the second image 228 enclosed by the path 320. The points on the path 320 may be associated with depth values that correspond to z coordinates of the nearest edges of the object so that, when modified, the path 320 lies within a 2D plane that is not necessarily at z=0. For example, when the top of the table is the identified object within a path, a modified path may lie in a 2D plane that is coincident with the top of the table.

The points on the path 320 may be adjusted so that the path 320 does not lie within a 2D plane and is a 3D path. For example, when a leg of the table is the identified object within a path, a modified path may lie in a 3D surface that is coincident with edges of two different sides of one leg of the table. In one embodiment, the modified path 320 may be implemented as a stereoscopic image pair in the first image 226 and the second image 228, so that the modified path 320 appears to the user to vary in depth.

In yet another embodiment, the application 222 may analyze the portion of the first image 226 and the second image 228 enclosed within the path 320. The application may generate a histogram that represents the distribution of a pixel characteristic in the portion of the first image 226 and the second image 228 enclosed within the path 320. A pixel characteristic may be a value for one or more color channels of the pixel (e.g., a red color channel, a green color channel, a blue color channel, a luminance channel, a chrominance channel, etc.) or a depth value of the pixel. For example, the histogram may determine the color or depth of the pixels that occur with the highest frequency within the portion of the first image 226 and the second image 228 enclosed by the path 320. The application 222, using the information in the histogram and, potentially, additional information provided by a user (e.g., threshold values that adjust the accuracy of a matching algorithm), then determines the selected lasso region 330 based on the object associated with the most frequently recurring pixel characteristic. In one embodiment, the colors and/or depths identified by the histogram may be used to select points assumed to be associated with the objects and the application 222 detects the edges of the selected objects by searching out from these points and connecting adjacent and contiguous regions between the points that are not bisected by a distinct edge.

As described herein, the application 222 may implement various algorithms well-known in the art to perform the analysis of the portion of the first image 226 and the second image 228 enclosed within the path 320. For example, the application 222 may implement edge detection algorithms, object recognition algorithms, pattern matching algorithms, pattern recognition algorithms, and the like. In some embodiments, the application 222 may utilize a parallel processing unit such as a graphics processing unit to implement at least a portion of such algorithms. One such parallel processing unit is described below in conjunction with FIGS. 4 and 5.

The path 320 may be adjusted by the application 222 to define the selected lasso region 330 and enclose the identified object so that the number of pixels included in the path 320 increases or decreases. The number of pixels included in the path 320 may also remain the same, although the shape of the path 320 may be modified in one or more dimension (e.g., x, y, and z).

As shown in FIG. 3D, once the application 222 has determined a selected lasso region 330, the application 222 may compare the contents of the selected lasso region 330 to other portions of the image to determine whether other portions of the image substantially match the contents of the lasso region 330. In one embodiment, the application 222 divides the first image 226 and the second image 228 into a plurality of blocks 340. Each block 340 may comprise a window of pixels such as a five pixel by five pixel portion of the first image 226 and the second image 228. The application 222 may generate a histogram that represents the distribution of a pixel characteristic in the block 340. If the histogram that represents the distribution of the pixel characteristic in the block 340 substantially matches the histogram that represents the distribution of the pixel characteristic in the portion of the first image 226 and the second image 228 enclosed by the selected lasso region 330, then the block 340 is assumed to be included in a second region of the image that is associated with the same object or similar object to the object enclosed within the selected lasso region 330. The application 222 may then select one or more other regions in the first image 226 and the second image 228 that are associated with blocks 340 that substantially match the selected lasso region 330 and extend the selected lasso region 330 to include those one or more other regions.

For example, a first block 340(0) is located at a portion of the first image 226 and the second image 228 that overlays pixels associated with a table and a wall within a room illustrated by the stereoscopic image 224. The colors of the table and the wall do not substantially match the colors of a floor that is selected by the selected lasso region 330. However, a few blocks away from the first block 340(0), a second block 340(1) is located at a portion of the first image 226 and the second image 228 that overlays pixels associated with a different portion of the floor. Thus, the histogram of the second block 340(1) substantially matches the histogram of the selected lasso region 330. The application identifies the second block 340(1) as being included within a region that substantially matches the selected lasso region 330. By combining adjacent blocks that are identified as substantially matching the selected lasso region 330, the application 222 selects one or more additional regions of the image and extends the selected lasso region 330 to include the one or more additional regions. It will be appreciated that the resulting selected lasso region 330 may comprise two or more non-contiguous portions of the first image 226 and the second image 228.

In another example, the entire table may be identified as a selected object by identifying regions of pixels with depths that substantially match depths within a lasso region (not shown). The legs of the table and edges 336 of the table top may be different colors compared with the top surface 335 of the table, but because the depth values are identified as matching, the adjacent blocks that overlay pixels associated with the tables edges 336 and legs may be identified as part of the same object. Pixels within the table legs and edges 336 may be combined to extend a selected lasso region to include the entire table (e.g., top 335, edges 336, and legs). In one embodiment, the application 222 may be configured to identify linearly increasing or decreasing depths as substantially matching a lasso region so that the top surface 335 of the table, or other surface having a linearly changing depth, is identified as a single object.

In one embodiment, the application 222 first identifies the blocks 340 within the image that substantially match the selected lasso region 330. Then, the application 222 merges adjacent blocks 340 into contiguous regions of the image 224. After the application 222 has merged the blocks 340, the application 222 analyzes the portions of the image in the vicinity of the merged blocks to identify edges of objects overlaid by the merged blocks 340. In other words, rather than selecting only the pixels overlaid by the merged blocks 340, the application 222 identifies the edges of the objects overlaid by the merged blocks and selects the tight outline of the objects as the one or more additional regions to add to the selected lasso region 330. It will be appreciated that the technique described above applies to one implementation of a color, pattern, and/or depth matching algorithm. Again, in other embodiments that implement, e.g., shape matching algorithms or pattern recognition algorithms and the like may require different techniques to incorporate the specific algorithm, such as by using variable block sizes, comparing objects (e.g., objects may be identified as shapes using an edge detection algorithm) in the image to a scaled and rotated shape.

As shown in FIG. 3E, the selected lasso region 330 has been expanded to include two additional portions of the first image 226 and the second image 228 that represent other visible sections of the floor. It will be appreciated that the selected lasso region 330 comprises non-contiguous portions of the first image 226 and the second image 228.

Again, the application 222 may implement the functions described above on a processor 210 such as a CPU. The application 222 may also implement at least a portion of the functions on one or more co-processors such as a parallel processing unit described below.

Figure 4:
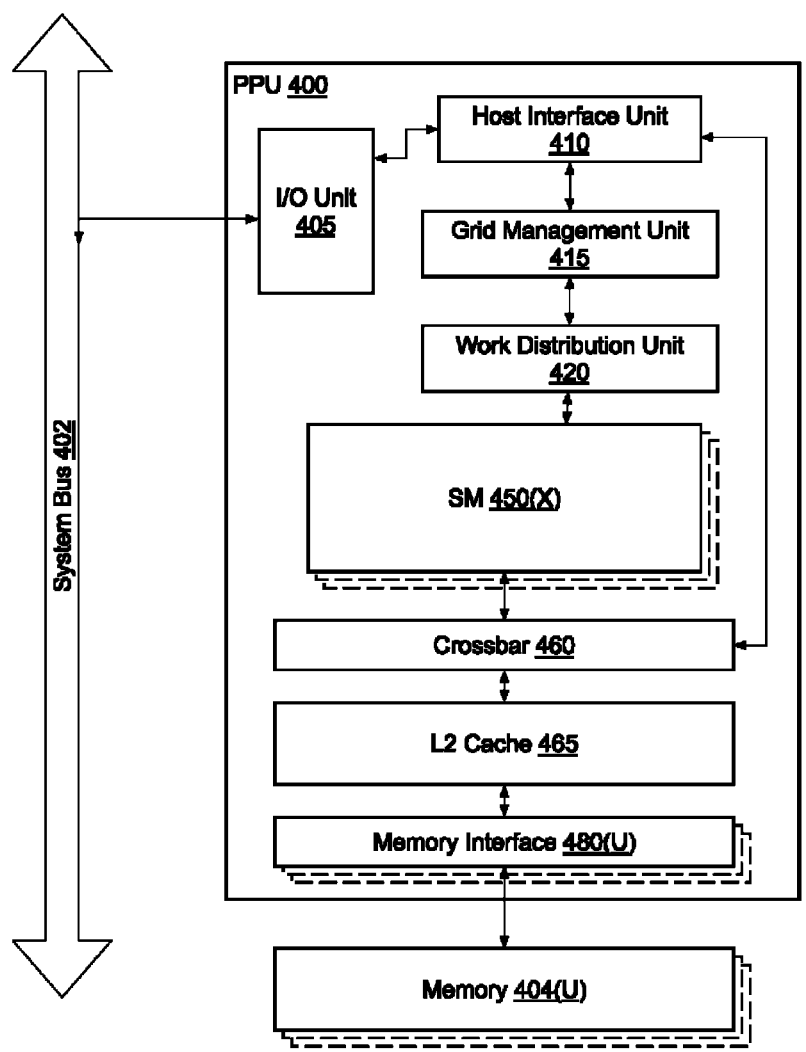
FIG. 4 illustrates a parallel processing unit (PPU), in accordance with one embodiment.

FIG. 4 illustrates a parallel processing unit (PPU) 400, in accordance with one embodiment. While a parallel processor is provided herein as an example of the PPU 400, it should be strongly noted that such processor is set forth for illustrative purposes only, and any processor may be employed to supplement and/or substitute for the same. In one embodiment, the PPU 400 is configured to execute a plurality of threads concurrently in two or more streaming multi-processors (SMs) 450. A thread (i.e., a thread of execution) is an instantiation of a set of instructions executing within a particular SM 450. Each SM 450, described below in more detail in conjunction with FIG. 5, may include, but is not limited to, one or more processing cores, one or more load/store units (LSUs), a level-one (L1) cache, shared memory, and the like.

In one embodiment, the PPU 400 includes an input/output (I/O) unit 405 configured to transmit and receive communications (i.e., commands, data, etc.) from a central processing unit (CPU) (not shown) over the system bus 402. The I/O unit 405 may implement a Peripheral Component Interconnect Express (PCIe) interface for communications over a PCIe bus. In alternative embodiments, the I/O unit 405 may implement other types of well-known bus interfaces.

The PPU 400 also includes a host interface unit 410 that decodes the commands and transmits the commands to the grid management unit 415 or other units of the PPU 400 (e.g., memory interface 480) as the commands may specify. The host interface unit 410 is configured to route communications between and among the various logical units of the PPU 400.

In one embodiment, a program encoded as a command stream is written to a buffer by the CPU. The buffer is a region in memory, e.g., memory 404 or system memory, that is accessible (i.e., read/write) by both the CPU and the PPU

400. The CPU writes the command stream to the buffer and then transmits a pointer to the start of the command stream to the PPU 400. The host interface unit 410 provides the grid management unit (GMU) 415 with pointers to one or more streams. The GMU 415 selects one or more streams and is configured to organize the selected streams as a pool of pending grids. The pool of pending grids may include new grids that have not yet been selected for execution and grids that have been partially executed and have been suspended.

A work distribution unit 420 that is coupled between the GMU 415 and the SMs 450 manages a pool of active grids, selecting and dispatching active grids for execution by the SMs 450. Pending grids are transferred to the active grid pool by the GMU 415 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 420. In addition to receiving grids from the host interface unit 410 and the work distribution unit 420, the GMU 410 also receives grids that are dynamically generated by the SMs 450 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 400. An application may include instructions (i.e., API calls) that cause the driver kernel to generate one or more grids for execution. In one embodiment, the PPU 400 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 400 comprises X SMs 450(X). For example, the PPU 400 may include 15 distinct SMs 450. Each SM 450 is multi-threaded and configured to execute a plurality of threads (e.g., 32 threads) from a particular thread block concurrently. Each of the SMs 450 is connected to a level-two (L2) cache 465 via a crossbar 460 (or other type of interconnect network). The L2 cache 465 is connected to one or more memory interfaces 480. Memory interfaces 480 implement 16, 32, 64, 128-bit data buses, or the like, for high-speed data transfer. In one embodiment, the PPU 400 comprises U memory interfaces 480(U), where each memory interface 480(U) is connected to a corresponding memory device 404(U). For example, PPU 400 may be connected to up to 6 memory devices 404, such as graphics double-data-rate, version 5, synchronous dynamic random access memory (GDDR5 SDRAM).

In one embodiment, the PPU 400 implements a multi-level memory hierarchy. The memory 404 is located off-chip in SDRAM coupled to the PPU 400. Data from the memory 404 may be fetched and stored in the L2 cache 465, which is located on-chip and is shared between the various SMs 450. In one embodiment, each of the SMs 450 also implements an L1 cache. The L1 cache is private memory that is dedicated to a particular SM 450. Each of the L1 caches is coupled to the shared L2 cache 465. Data from the L2 cache 465 may be fetched and stored in each of the L1 caches for processing in the functional units of the SMs 450.

In one embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 415 may configure one or more SMs 450 to execute a vertex shader program that processes a number of vertices defined by the model data. In one embodiment, the GMU 415 may configure different SMs 450 to execute different shader programs concurrently. For example, a first subset of SMs 450 may be configured to execute a vertex shader program while a second subset of SMs 450 may be configured to execute a pixel shader program. The first subset of SMs 450 processes vertex data to produce processed vertex data and writes the processed vertex data to the L2 cache 465 and/or the memory 404. After the processed vertex data is rasterized (i.e., transformed from three-dimensional data into two-dimensional data in screen space) to produce fragment data, the second subset of SMs 450 executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 400 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 400 is embodied on a single semiconductor substrate. In another embodiment, the PPU 400 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 400 may be included on a graphics card that includes one or more memory devices 404 such as GDDR5 SDRAM. The graphics card may be configured to interface with a PCIe slot on a motherboard of a desktop computer that includes, e.g., a northbridge chipset and a southbridge chipset. In yet another embodiment, the PPU 400 may be an integrated graphics processing unit (iGPU) included in the chipset (i.e., Northbridge) of the motherboard.

Figure 5:
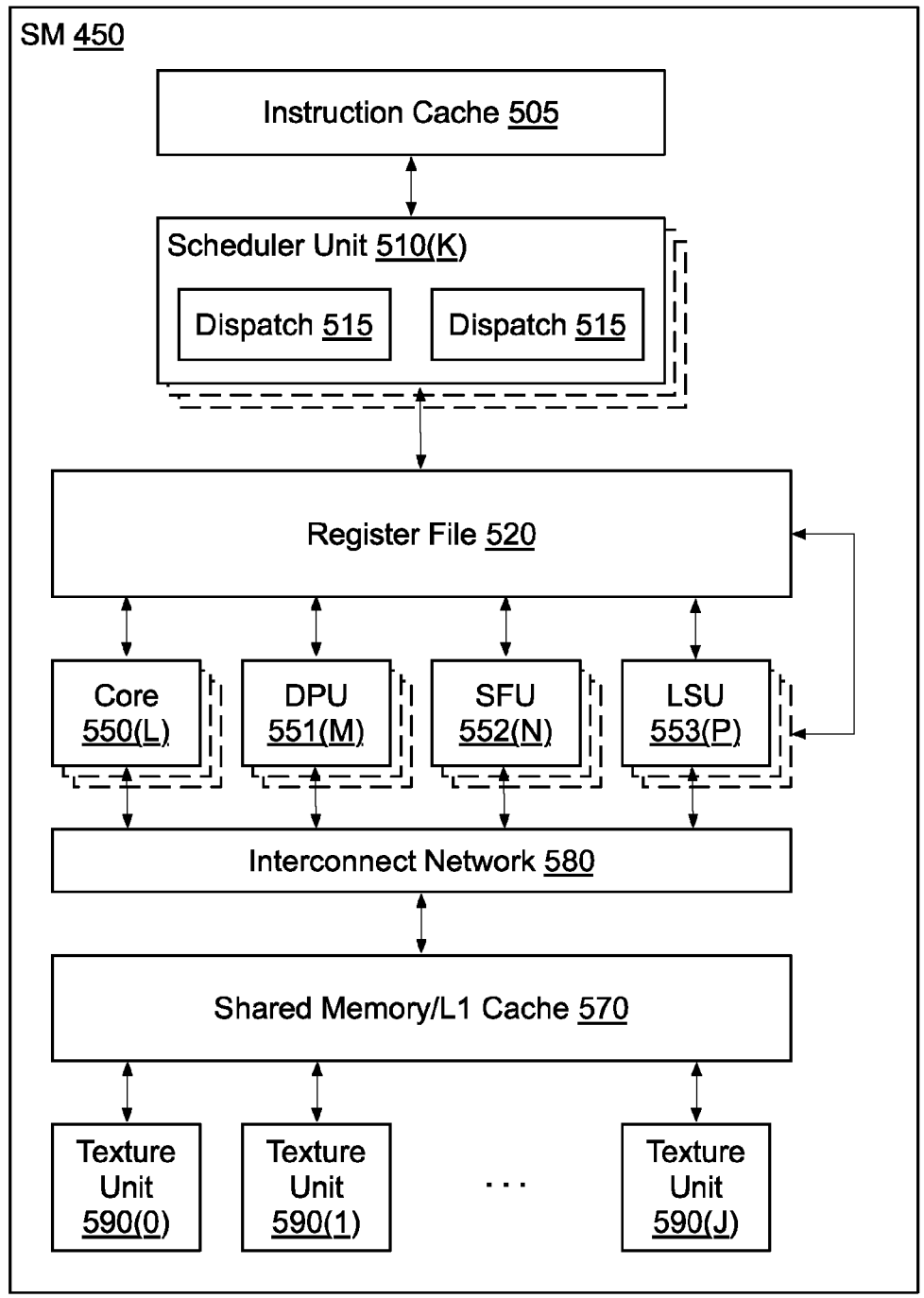
FIG. 5 illustrates the streaming multi-processor of FIG. 4, according to one embodiment.

FIG. 5 illustrates the streaming multi-processor 450 of FIG. 4, according to one embodiment. As shown in FIG. 5, the SM 450 includes an instruction cache 505, one or more scheduler units 510, a register file 520, one or more processing cores 550, one or more double precision units (DPUs) 551, one or more special function units (SFUs) 552, one or more load/store units (LSUs) 553, an interconnect network 580, a shared memory/L1 cache 570, and one or more texture units 590.

As described above, the work distribution unit 420 dispatches active grids for execution on one or more SMs 450 of the PPU 400. The scheduler unit 510 receives the grids from the work distribution unit 420 and manages instruction scheduling for one or more thread blocks of each active grid. The scheduler unit 510 schedules threads for execution in groups of parallel threads, where each group is called a warp. In one embodiment, each warp includes 32 threads. The scheduler unit 510 may manage a plurality of different thread blocks, allocating the thread blocks to warps for execution and then scheduling instructions from the plurality of different warps on the various functional units (i.e., cores 550, DPUs 551, SFUs 552, and LSUs 553) during each clock cycle.

In one embodiment, each scheduler unit 510 includes one or more instruction dispatch units 515. Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 450 includes a register file 520 that provides a set of registers for the functional units of the SM 450. In one embodiment, the register file 520 is divided between each of the functional units such that each functional unit is allocated a dedicated portion of the register file 520. In another embodiment, the register file 520 is divided between the different warps being executed by the SM 450. The register file 520 provides temporary storage for operands connected to the data paths of the functional units.

Each SM 450 comprises L processing cores 550. In one embodiment, the SM 450 includes a large number (e.g., 192, etc.) of distinct processing cores 550. Each core 550 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 450 also comprises M DPUs 551 that implement double-precision floating point arithmetic, N SFUs 552 that perform special functions (e.g., copy rectangle, pixel blending operations, and the like), and P LSUs 553 that implement load and store operations between the shared memory/L1 cache 570 and the register file 520. In one embodiment, the SM 450 includes 64 DPUs 551, 32 SFUs 552, and 32 LSUs 553.

Each SM 450 includes an interconnect network 580 that connects each of the functional units to the register file 520 and the shared memory/L1 cache 570. In one embodiment, the interconnect network 580 is a crossbar that can be configured to connect any of the functional units to any of the registers in the register file 520 or the memory locations in shared memory/L1 cache 570.

In one embodiment, the SM 450 is implemented within a GPU. In such an embodiment, the SM 450 comprises J texture units 590. The texture units 590 are configured to load texture maps (i.e., a 2D array of texels) from the memory 404 and sample the texture maps to produce sampled texture values for use in shader programs. The texture units 590 implement texture operations such as anti-aliasing operations using mip-maps (i.e., texture maps of varying levels of detail). In one embodiment, the SM 450 includes 16 texture units 590.

The PPU 400 described above may be configured to perform highly parallel computations much faster than conventional CPUs. Parallel computing has advantages in graphics processing, data compression, biometrics, stream processing algorithms, and the like.

Figure 6A:
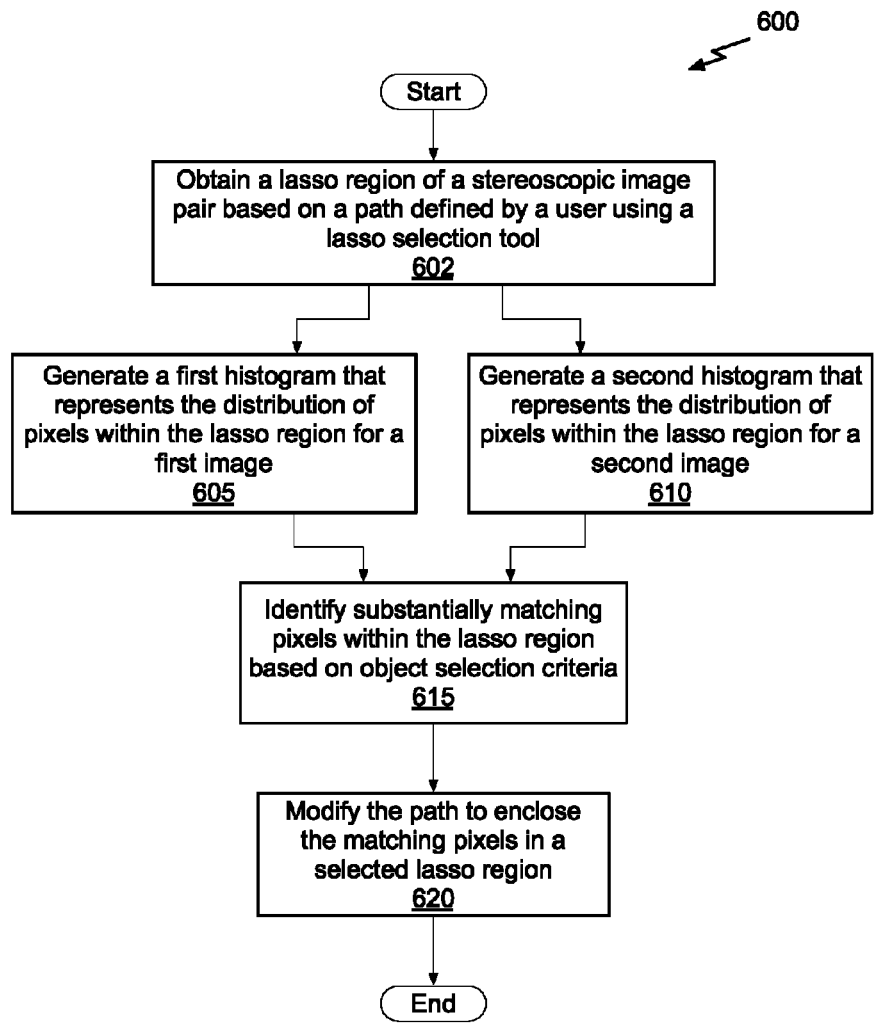
FIG. 6A illustrates a flowchart of another method for providing a lasso for a stereoscopic image editor, in accordance with another embodiment.

FIG. 6A illustrates a flowchart 600 of another method for providing a lasso for a stereoscopic image editor, in accordance with another embodiment. At step 602, the application 222 obtains a lasso region of the stereoscopic image 224 based on a path 320 defined by a user using the lasso selection tool 275. Steps 605 and 610 may be performed in parallel for the first image 226 and the second image 228. At step 605, the application 222 generates a first histogram that represents the distribution of pixels within the lasso region for the first image 226. At step 610, the application 222 generates a second histogram that represents the distribution of pixels within the lasso region for the second image 228.

At step 615, the application 222 compares the distribution of the pixels within the histogram to identify one or more pixels that substantially match within the lasso region defined by the path 320. The matching pixels define a selected object that is at least partially included within the lasso region. In one embodiment, step 615 is performed, at least in part, using a parallel processing unit such as PPU 400. At step 620, the application 222 modifies the path to enclose the matching pixels to generate the selected lasso region 330 shown in FIGS. 3C and 3D. In one embodiment, depth values that correspond to z coordinate values of the identified object may be associated with the modified path that defines the selected lasso region 330.

It will be appreciated that, in some embodiments, steps 605, 610, and 615 may be replaced with steps that implement another algorithm for identifying portions of the first and second images within the lasso region that substantially match to identify an object. In one embodiment, the step 615 may implement a pattern recognition algorithm that matches patterns discovered in the lasso region. However, other matching algorithms are contemplated as being within the scope of the present disclosure and the steps included in such algorithms may be added to the method of flowchart 600 in lieu of one or more of steps 605, 610, and 615.

Figure 6B:
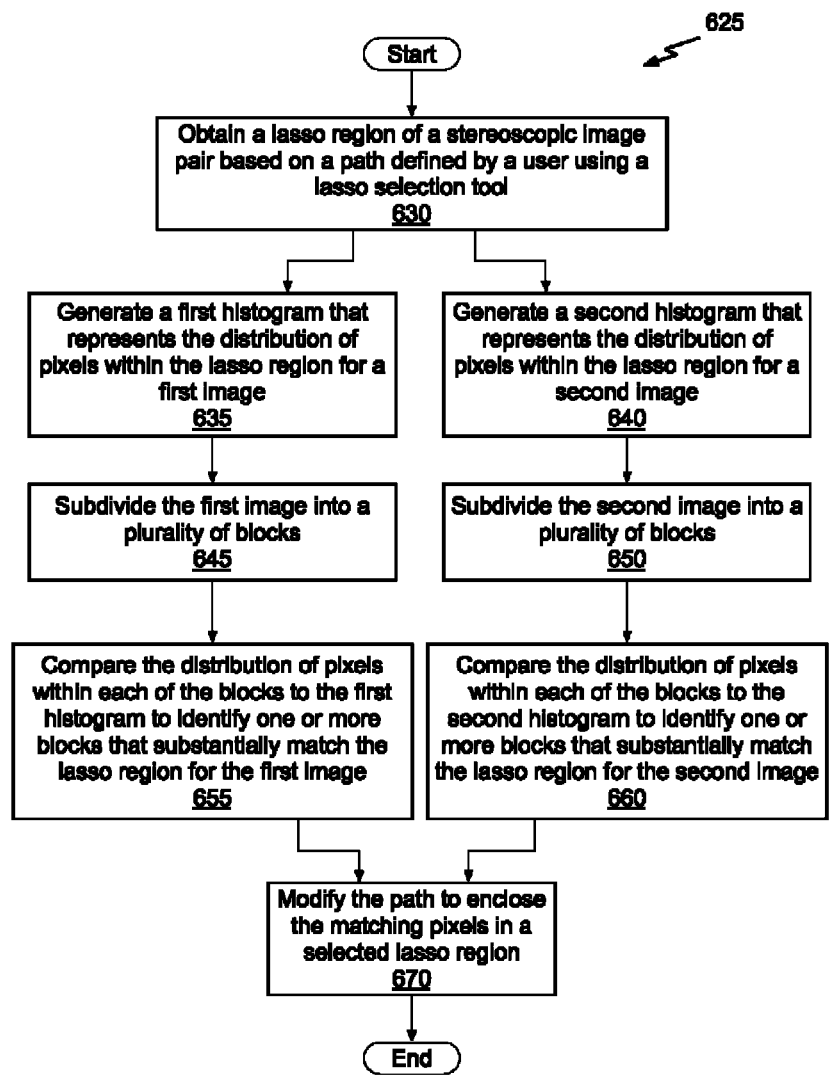
FIG. 6B illustrates a flowchart of a method for automatically extending a lasso region for a stereoscopic image editor, in accordance with another embodiment.

FIG. 6B illustrates a flowchart of a method 625 for automatically extending a lasso region for a stereoscopic image editor, in accordance with another embodiment. At step 630, the application 222 obtains a lasso region of the stereoscopic image 224 based on a path 320 defined by a user using the lasso selection tool 275. Steps 635, 640, 645, 650, 655, and 660 may be performed in parallel for the first image 226 and the second image 228. At step 635, the application 222 generates a first histogram that represents the distribution of pixels within the lasso region for the first image 226. At step 640, the application 222 generates a second histogram that represents the distribution of pixels within the lasso region for the second image 228.

At step 645, the application 222 subdivides the first image 226 into a plurality of blocks 340. At step 655, the application 222 compares the distribution of the pixels within each of the blocks to the first histogram to identify one or more blocks that substantially match the lasso region. In one embodiment, step 655 is performed, at least in part, using a parallel processing unit such as PPU 400. At step 655, the application 222 also selects one or more additional regions of the first image 226 to add to the lasso region.

At step 650, the application 222 subdivides the second image 228 into a plurality of blocks 340. At step 660, the application 222 compares the distribution of the pixels within each of the blocks to the second histogram to identify one or more blocks that substantially match the lasso region. In one embodiment, step 660 is performed, at least in part, using a parallel processing unit such as PPU 400. At step 660, the application 222 also selects one or more additional regions of the second image 228 to add to the lasso region. At step 670, the application 222 modifies the path to enclose the matching pixels to generate the selected lasso region 330 shown in FIG. 3E.

It will be appreciated that, in some embodiments, steps 635, 640, 645, 650, 655, and 660 may be replaced with steps that implement another algorithm for identifying portions of the first and second images that substantially match the lasso region defined by the path 320. In one embodiment, the steps 635, 640, 645, 650, 655 may implement a pattern recognition algorithm that matches patterns discovered in the lasso region to patterns in other portions of the image. For example, the lasso region may highlight a chair or couch having a particular pattern thereon, such as a plaid pattern. The pattern recognition algorithm may search the image for other portions of the image that have a similar pattern. In another embodiment, steps 635, 640, 645, 650, 655, and 660 may implement a shape matching algorithm that matches the shape of the selected lasso region 330 to the shape of other objects within the stereoscopic image 224. It will be appreciated that pattern recognition algorithms or shape matching algorithms comprise steps different from steps 635, 640, 645, 650, 655, and 660 described above. However, such other algorithms are contemplated as being within the scope of the present disclosure and the steps included in such algorithms may be added to the method of flowchart 625 in lieu of one or more of steps 635, 640, 645, 650, 655, and 660.

Figure 7:
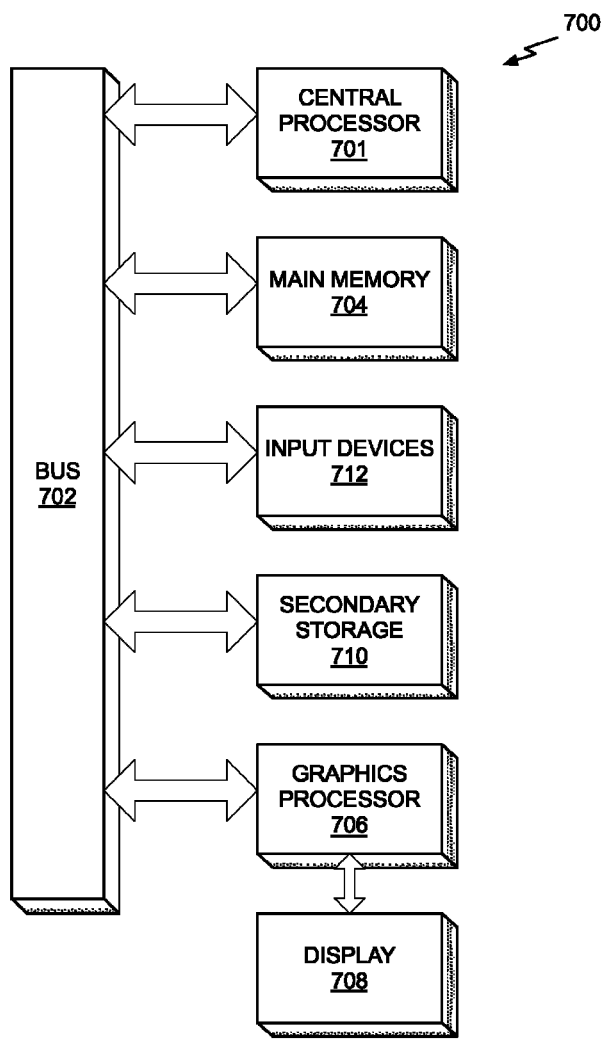
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU). In one embodiment, the processor 701 and/or the GPU 706 may be utilized by the application 222 to automatically extend the lasso region to other portions of the image 224.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a display device, a stereoscopic image pair comprising a left eye image and a right eye image, the left eye image and the right eye image each having an object with corresponding portions thereof being offset between the left eye image and a right eye image;

displaying, by the display device, the stereoscopic image pair for viewing by a user as a three-dimensional (3D) image, wherein each portion of the object offset between the left eye image and a right eye image causes the portion to appear to the user as being at a depth other than a depth of a surface of the display device;

while the user is viewing the 3D image through the display device, obtaining, through the display device, a two-dimensional (2D) path defined by the user using a lasso selection tool;

identifying, by a parallel processing unit, at least a portion of the object as being included within the 2D path defined by the user;

automatically modifying the 2D path, by the parallel processing unit, to be a 3D path having points with one or more depths each corresponding with the depth of a coincident portion of the object;

implementing, by the parallel processing unit, the 3D path in the left eye image and the right eye image, so that, when viewed by the user, the 3D path appears to the user as being, at least in part, at a depth other than the depth of the surface of the display device.

2. The method of claim 1, further comprising deriving depth coordinate values of the object based on the left eye image and the right eye image.

3. A non-transitory computer-readable storage medium storing instructions that, when executed by a processor, cause the processor to perform steps comprising:

receiving, by a display device, a stereoscopic image pair comprising a left eye image and a right eye image, the left eye image and the right eye image each having an object with corresponding portions thereof being offset between the left eye image and a right eye image;

displaying, by the display device, the stereoscopic image pair for viewing by a user as a three-dimensional (3D) image, wherein each portion of the object offset between the left eye image and a right eye image causes the portion to appear to the user as being at a depth other than a depth of a surface of the display device;

while the user is viewing the 3D image through the display device, obtaining, through the display device, a two-dimensional (2D) path defined by the user using a lasso selection tool;

identifying, by a parallel processing unit, at least a portion of the object as being included within the 2D path defined by the user;

automatically modifying the 2D path, by the parallel processing unit, to be a 3D path having points with one or more depths each corresponding with the depth of a coincident portion of the object;

implementing, by the parallel processing unit, the 3D path in the left eye image and the right eye image, so that, when viewed by the user, the 3D path appears to the user as being, at least in part, at a depth other than the depth of the surface of the display device.

4. A system, comprising;

a memory storing a stereoscopic image pair comprising a left eye image and a right eye image each having an object with corresponding portions thereof being offset between the left eye image and a right eye image;

a display device configured to:
 receive the stereoscopic image pair,
 display the stereoscopic image pair for viewing by a user as a three-dimensional (3D) image, wherein each portion of the object offset between the left eye image and a right eye image causes the portion to appear to the user as being at a depth other than a depth of a surface of the display device, and
 display a graphical user interface in conjunction with the stereoscopic image pair; and a parallel processing unit that is coupled to the display device and configured to:
 obtain, through the graphical user interface while the user is viewing the 3D image through the display device, a two-dimensional (2D) path defined by the user using a lasso selection tool,
 identify at least a portion of the object as being included within the 2D path defined by the user,
 automatically modify the 2D path to be a 3D path having points with one or more depths each corresponding with the depth of a coincident portion of the object;
 implement the 3D path in the left eye image and the right eye image, so that, when viewed by the user, the 3D path appears to the user as being, at least in part, at a depth other than the depth of the surface of the display device.

* * * * *